United States Patent
Rehr et al.

(10) Patent No.: US 11,133,722 B2
(45) Date of Patent: Sep. 28, 2021

(54) ELECTRIC MOTOR WITH AT LEAST ONE COOLANT CHANNEL

(71) Applicant: AUDI AG, Ingolstadt (DE)

(72) Inventors: Alfred Rehr, Hepberg (DE); Nico Schobeß, Gaimersheim (DE); Thierry Caramigeas, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 525 days.

(21) Appl. No.: 16/036,222

(22) Filed: Jul. 16, 2018

(65) Prior Publication Data

US 2019/0081529 A1 Mar. 14, 2019

(30) Foreign Application Priority Data

Sep. 12, 2017 (DE) .................. 10 2017 216 066.7

(51) Int. Cl.
| | |
|---|---|
| *H02K 5/20* | (2006.01) |
| *H02K 1/18* | (2006.01) |
| *H02K 9/19* | (2006.01) |
| *H02K 1/20* | (2006.01) |
| *H02K 9/08* | (2006.01) |

(Continued)

(52) U.S. Cl.
CPC .................. *H02K 5/20* (2013.01); *H02K 1/18* (2013.01); *H02K 1/20* (2013.01); *H02K 9/08* (2013.01); *H02K 9/19* (2013.01); *H02K 9/197* (2013.01); *H02K 5/04* (2013.01)

(58) Field of Classification Search
CPC ............ H02K 1/20; H02K 9/197; H02K 1/16; H02K 1/18; H02K 9/08; H02K 5/04

USPC .................................. 310/64, 60 A, 65, 422
See application file for complete search history.

(56) References Cited

U.S. PATENT DOCUMENTS

| | | |
|---|---|---|
| 2,735,950 A | 2/1956 | Brown |
| 4,839,545 A * | 6/1989 | Chitayat .................. H02K 1/20 |
| | | 310/12.23 |

(Continued)

FOREIGN PATENT DOCUMENTS

| | | |
|---|---|---|
| DE | 10 2012 022 452 A1 | 5/2014 |
| DE | 11 2014 001 277 T5 | 12/2015 |

(Continued)

OTHER PUBLICATIONS

Search Report dated Jan. 2, 2019 in corresponding European Application No. 18178552.8; 11 pages including partial machine-generated English-language translation.

(Continued)

*Primary Examiner* — Tulsidas C Patel
*Assistant Examiner* — Robert E Mates
(74) *Attorney, Agent, or Firm* — Maier & Maier, PLLC

(57) ABSTRACT

An electric motor, in particular an internal rotor motor, with a stator constructed from laminations and with a rotor arranged concentrically in the stator, with a housing surrounding the stator circumferentially, and with two housing caps for axially closing the housing at both ends and for accommodating and carrying a shaft of the rotor, wherein the laminations each have at least three crosspieces arranged on the circumference for creating at least one coolant channel between the stator and the housing, and wherein the at least one coolant channel can be bounded by the housing caps in a fluidtight manner.

18 Claims, 4 Drawing Sheets

(51) Int. Cl.
*H02K 5/04* (2006.01)
*H02K 9/197* (2006.01)

(56) References Cited

U.S. PATENT DOCUMENTS

| | | | | |
|---|---|---|---|---|
| 5,023,500 | A | * | 6/1991 | Sisk .................. H02K 1/16 29/596 |
| 5,331,238 | A | | 7/1994 | Johnsen |
| 5,619,389 | A | * | 4/1997 | Dunfield ............ G11B 19/2018 310/216.124 |
| 5,957,589 | A | * | 9/1999 | Lee .................. F16C 33/74 384/112 |
| 8,183,723 | B2 | | 5/2012 | Fee et al. |
| 2010/0007227 | A1 | * | 1/2010 | Smith ............... H02K 5/20 310/64 |
| 2010/0176668 | A1 | | 7/2010 | Murakami et al. |
| 2010/0176673 | A1 | * | 7/2010 | Wright ............... H02K 5/15 310/88 |
| 2014/0042841 | A1 | | 2/2014 | Rippel et al. |
| 2014/0117798 | A1 | | 5/2014 | Coldwate et al. |

FOREIGN PATENT DOCUMENTS

| | | |
|---|---|---|
| DE | 10 2014 219 724 A1 | 3/2016 |
| DE | 102014220510 A1 | 4/2016 |
| WO | 2016/132060 A1 | 8/2016 |

OTHER PUBLICATIONS

Office Action dated Aug. 11, 2020 in corresponding Chinese Application No. 201810952759.8; 8 pages.

German Office Action dated May 22, 2018, in connection with corresponding German Application No. 10 2017 216 066.7 (10pp., including machine-generated English translation).

* cited by examiner

ELECTRIC MOTOR WITH AT LEAST ONE COOLANT CHANNEL

FIELD

The present invention relates to an electric motor, in particular an internal rotor motor with a stator constructed from laminations and with a rotor arranged concentrically in the stator, with a housing surrounding the stator circumferentially, and with two housing caps for axially closing the housing at both ends and for accommodating and carrying a shaft of the rotor, wherein the laminations each have at least three crosspieces arranged on the circumference side for creating at least one coolant channel between the stator and the housing, and wherein the at least one coolant channel can be bounded by the housing caps in a fluidtight manner.

BACKGROUND

In electric motors with a fixed stator, the stator is made up of punched discs or laminations, in the inner region of which recesses for windings are arranged. In this case, the outer region is cylindrical in form. The laminations are axially stacked on one another, so that a cylindrical body is created. Through a thermal treatment, the discs adhere together and a permanently joined unit is created. The waste heat of the electric motor is dissipated, as a rule, via the laminations and the housing. For this purpose, the housing is generally equipped with one channel or a plurality of channels, through which a cooling fluid is conveyed. Alternatively, two-part solutions are also available, in which an additional cooling jacket, together with the housing, forms the cooling channel. The cooling fluid flows through the sealed channel and does not come into contact with the stator.

However, housings of this kind with integrated cooling channels are complicated to manufacture and cost-intensive. Through the utilization of an additional cooling jacket, it is possible to simplify the manufacture of the parts, although, for this purpose, an additional component must be affixed to the housing. In both cases, however, the cooling fluid is separated in space from the stator and hence separated from the heat source by walls of the housing or of the integrated cooling channels. This spatial separation is necessary, in particular, based on the electrical conductivity of the cooling fluid and based on the lack of sealing of the stator with respect to the rotor.

DE 11 2014 001 277 T5 discloses a microchannel heat exchanger integrated in a stator core. The stator core is constructed from stacked metal sheets that have different geometries at their outer diameter and form cooling channels, through which a coolant flows.

DE 10 2014 219 724 A1 discloses an electric machine with a cooling system. In this case, the stator core is made up of stacked metal sheets and, on its outer diameter, comprises structures that form cooling channels, through which a coolant flows.

DE 10 2014 220 510 A1 discloses a lamination packet of a rotor or stator for an electric machine as well as a method for the fabrication thereof. The stator packet is made up of stacked metal sheets, which have perforations through which cooling channels are formed by which a coolant is circulated.

The invention is based on the object of creating an electric motor with a stator cooling in which, by use of simple technical means, the coolant is reliably separated from current-carrying components of the electric motor.

SUMMARY

A subject of the present invention is an electric motor, in particular an internal rotor motor, with a stator constructed from a large number of laminations arrayed axially with respect to one another, wherein the stator has stator teeth arranged in the direction of a rotor, which is concentrically arranged in the stator, for accommodating stator windings. The electric motor has a housing that radially encloses the stator as well as two housing caps for axially closing the housing at both ends and for accommodating and carrying a shaft of the rotor. In accordance with the invention, the laminations each have at least three crosspieces arranged circumferentially for creating at least one coolant channel between the stator and the housing, wherein the at least one coolant channel can be bounded by the housing caps in a fluidtight manner.

Through the design of the electric motor in accordance with the invention, at least one coolant channel can be formed between the housing—or, alternatively, a tube that serves as the housing—and the stator. In addition, depending on the design of the stator, the housing can also be rectangular, round, oval, or the like in shape. The cooling fluid or the coolant can flow laterally directly between the stator and the housing. The coolant channel is formed radially by the stator and the housing. In this way, it is possible to create a very compact construction of the at least one coolant channel and also of the electric motor. The laminations and the housing are simple to manufacture. In particular, the laminations can be formed on the side of the circumference and have radially outward extending crosspieces. For this purpose, recesses can be placed in already existing laminations on the circumference for the formation of crosspieces and of the coolant channels arranged between the crosspieces and the housing. Accordingly, through minor design measures relating to the lamination geometry, coolant channels can be created, wherein most of the other components of the electric motor can remain unchanged.

In this case, the cooling fluid flows through the coolant channel adjacent to the laminations and is in direct contact with the stator. In this way, the heat transfer can be optimized. Through a sealing of the stator with respect to the housing caps in a fluidtight manner, the coolant can be prevented from reaching the rotor, as a result of which a secure separation of the coolant from the windings of the stator is afforded.

In accordance with another embodiment, the stator has two spacer rings, each of which has at least one crosspiece arranged on the circumference side, wherein the laminations of the stator are arranged between the two spacer rings. The at least one spacer ring has at least one crosspiece for forming or for extending coolant channels formed by the laminations. In the outer region, the at least one spacer ring has the same diameter as the laminations. At least two spacer rings can be arranged in the housing and can be part of the stator. The at least one spacer ring serves as an axial extension of the laminations and of the at least one coolant channel. The crosspieces of the spacer ring replicate the crosspieces of the laminations and can extend the latter axially.

In accordance with another embodiment, the two spacer rings are arranged axially skewed with respect to each other. In each case, a spacer ring is positioned outward here, while the laminations are arranged between the two spacer rings.

The alignment of the laminations can be made after a spacer ring. For this purpose, the second spacer ring is arranged axially skewed. In this way, the cooling channel is formed and can be extended on the circumference side in a meandering form over the entire outer jacket surface of the stator. In this way, only one inlet and only one outlet are necessary. The entire stator can be cooled along the outer jacket surface. The spacer rings and the housing lids hereby serve as axial diverting regions of the coolant channel.

In accordance with another exemplary embodiment, the at least one crosspiece of the at least one lamination has at least one groove for accommodating a sealing means. Preferably, the top of a crosspiece of at least one crosspiece is arranged without a sealing means or is nearly free of the sealing means, because the reaction torque of the electric motor can be transmitted here to the housing. However, in order that no cooling fluid can penetrate into the motor via the crosspiece tops, the crosspieces of the laminations, which are arrayed axially with respect to one another, have a sealing edge or a groove longitudinally for accommodating a sealing means. In order to pretension the sealing edge adequately between the housing and the stator, it is possible to position suitable recesses at the crosspieces. Accordingly, the at least one coolant channel can be axially sealed with respect to the housing, so that it is possible to prevent any coolant exchange beyond the crosspieces. In this way, a flow of coolant can be conveyed through the stator in a controlled manner.

In accordance with another embodiment, at least one circumferentially arranged crosspiece of at least one spacer ring has a groove corresponding to the at least one lamination for accommodating a sealing means. Accordingly, the sealing means can be applied on the crosspieces of the spacer rings beyond the laminations, so that the entire coolant channel can be designed radially in a fluidtight manner. The stator is constructed in such a way that it can be inserted in a two-part mold. The demolding direction is axial in this case. Said mold can be, for example, a vulcanizing mold. In this operation, a sealing means is applied in the outer region of the stator and seals the coolant channel from an inner region of the stator.

In accordance with another embodiment, at least one spacer ring has at least one axially arranged groove for accommodating a sealing means. At their front side, the two spacer rings have recesses or grooves in the region of the bottom of the coolant channel on the spacer ring side. When the sealing means is applied, said recesses can be filled with the sealing means and create an axial sealing with respect to the inner space or with respect to the rotor. In the region of the crosspieces at the outer diameter, the axial sealing lips extend further at the front sides of the crosspieces of the spacer rings.

In accordance with another exemplary embodiment, at least one coolant channel is coated with the sealing means, at least in some regions. The coating can be pressed between the crosspieces of the stator and the crosspieces of the spacer rings and the housing and, accordingly, a completely fluidtight design is possible. In this way, the risk of leakage or penetration of the coolant to the windings as a result of age-related formation of soot between the laminations, for example, is prevented. In this case, a coating with the sealing means can be a final processing step of the stator, as a result of which a subsequent lacquering or preservation of the stator can be dispensed with.

In accordance with another embodiment, the at least one spacer ring is formed axially as a sealing means. Alternatively or additionally, the spacer ring can be formed from an elastic plastic or silicone, so that the spacer ring can be pressed between the housing cap and the stator and, at the same time, can serves as an axial seal. In this way, it is possible to dispense with additional sealing means.

In accordance with another embodiment, the stator has at least one sealing lamination, at least between a first lamination and a second lamination and between a last lamination and a penultimate lamination, respectively, for accommodation of the sealing means on the circumference side. The sealing lamination has a radial extension corresponding to the sealing means grooves in the crosspieces of the laminations. When the stator is mounted, the sealing laminations and the laminations can be installed alternately. When a sealing means is coated, the surrounding sealing means fills the grooves. The outer regions or the tops of the crosspieces of the laminations remain free of sealing means and can thus transmit the mechanical forces onto the housing. Through an alternating application of the laminations and sealing laminations, it is possible to create a meandering course of the edge of the sealing means along at least one crosspiece, which can withstand mechanical loads and be durable.

In accordance with another exemplary embodiment, the housing and/or the at least one housing cap has at least one coolant inlet and at least one coolant outlet. In this way, the coolant can be conveyed into and out of the coolant channel in a controlled manner for cooling the stator. Preferably, the coolant is only conveyed out after the cooling fluid has been circulated around the entire jacket surface of the stator. A plurality of coolant channels, which are independent of one another, each of which is provided with a coolant inlet and a coolant outlet, can also be present. Accordingly, it is possible to cool, in a targeted manner, regions of the stator that are especially subject to thermal load and hence produce more heat.

BRIEF DESCRIPTION OF THE DRAWINGS

The invention is illustrated schematically in the drawings based on the embodiments and is described with reference to the drawings. Shown herein are.

DETAILED DESCRIPTION

Figure 1A:
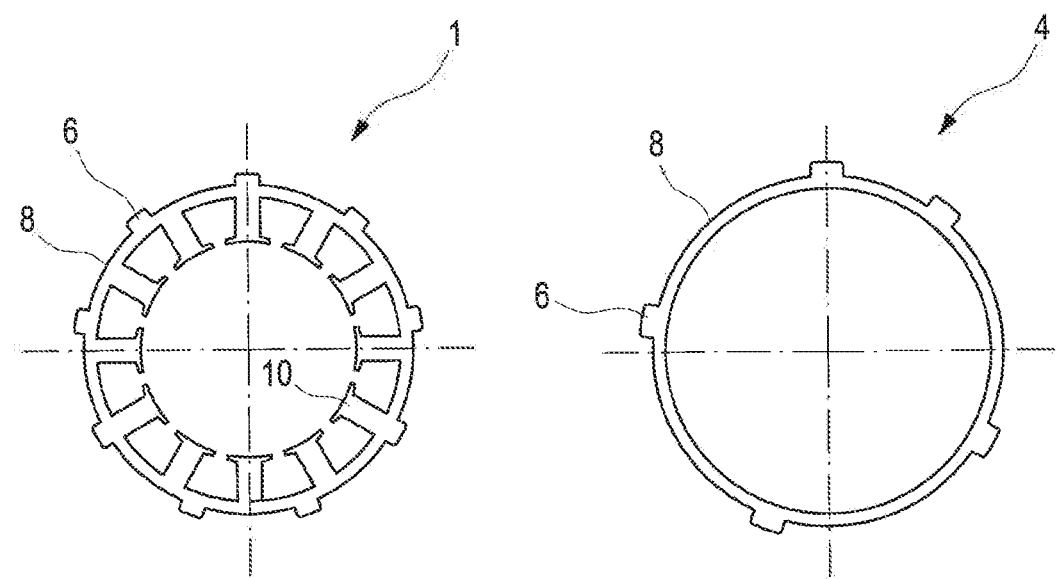
FIG. 1*a* in a plan view, a lamination of the stator and a spacer ring of the stator in an embodiment in accordance with the invention.

FIG. 1*a* shows, in a plan view, a lamination 1 of the stator 2 and a spacer ring 4 of the stator 2 in an embodiment in accordance with the invention. The lamination 1 and the spacer ring 4 have crosspieces 6 arranged on the circumference side. The crosspieces 6 space apart the laminations 1 and the spacer rings 4 relative to a housing and thereby form coolant channels 8. In an inner regions, the laminations 1 have stator teeth 10 for accommodating stator windings.

Figure 1B:
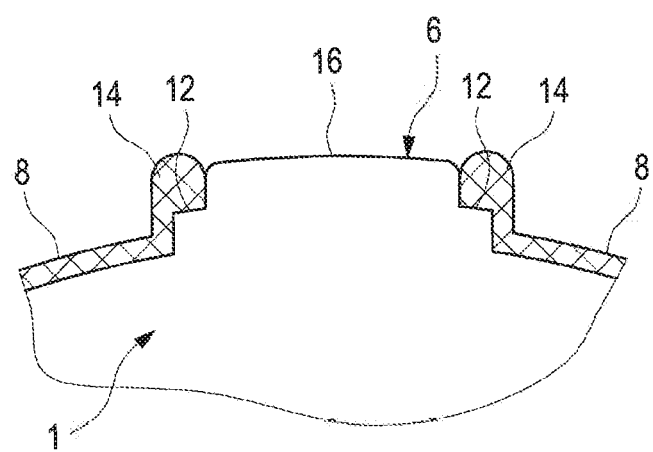
FIG. 1*b* in a detail view, a crosspiece of a lamination in an embodiment in accordance with the invention.

FIG. 1*b* illustrates, in a detailed view, a crosspiece 6 of a lamination 1 in an embodiment in accordance with the invention. In particular, a groove 12, which is arranged at flanks of the crosspiece 6 for accommodating a sealing means 14, is shown. In accordance with the exemplary embodiment, the sealing means 14 is distributed over the coolant channel 8 or serves as a coating of the coolant channel 8. A top 16 of a crosspiece is free of a sealing means 14, so that mechanical forces of the stator 2 can be transmitted through the top 16 of the crosspiece.

Figure 2:
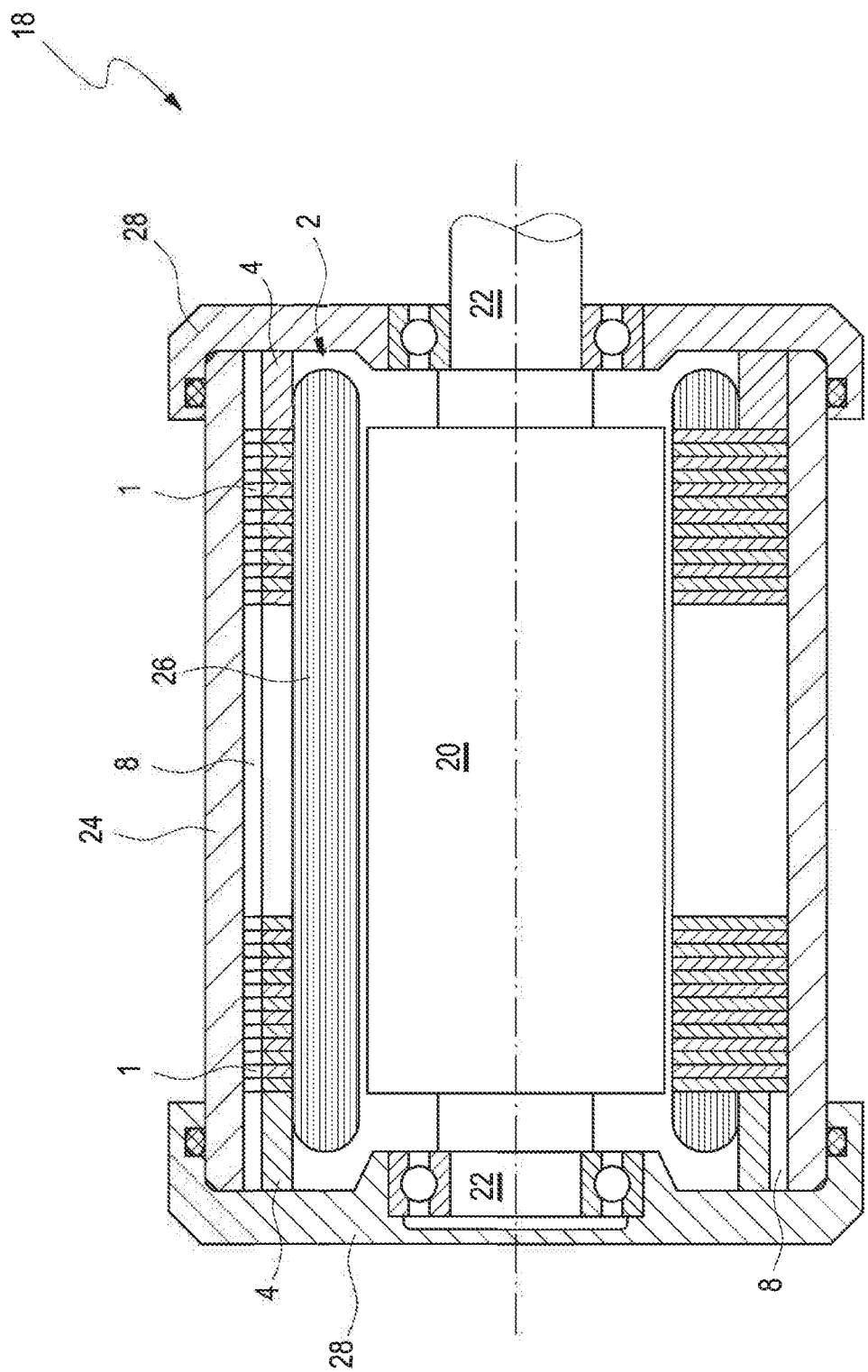
FIG. 2 in a cross section, an electric motor according to the invention.

FIG. 2 shows, in a cross section, an electric motor 18 according to the invention in accordance with an embodiment. The electric motor 18 has a rotor 20 with a shaft 22 arranged in the inner region of the stator 2. The stator 2 is arranged in a tubular housing 24. In this case, the stator 2 is made up of a large number of laminations 1 and two spacer rings 4 that axially bound the laminations 1. In the region of the rotor 20, the stator 2 has stator windings 26, which are arranged so as to extend axially. The housing 24 is closed axially at both ends by a respective housing cap 28. The housing caps 28 have bearings, which are not indicated by reference numbers, for accommodating and carrying the shaft 22 of the rotor 20. The coolant channels 8 are formed between the housing 24 and the stator 2. The coolant channels 8 are sealed axially by the housing caps 28 relative to the rotor 20 and with respect to the stator windings 26.

Figure 3:
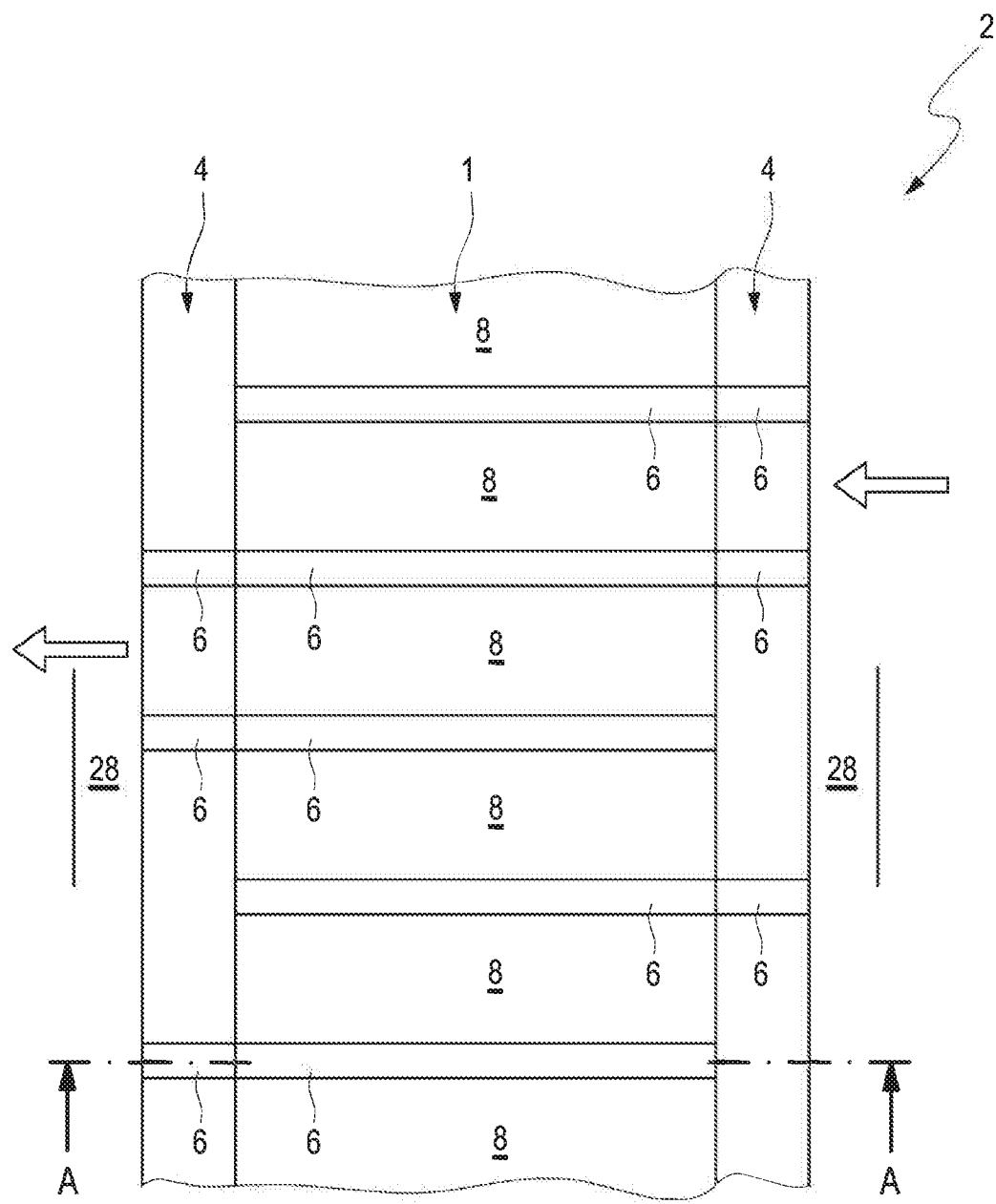
FIG. 3 in a schematic illustration, an excerpt of a winding of the stator according to the invention on the circumference side.

FIG. 3 shows, in a schematic illustration, an excerpt of a circumferential winding of the stator 2 according to the invention. The course of the coolant channels 8 along the stator 2 is demonstrated. The spacer rings 4 are arranged axially skewed with respect to one another, so that the crosspieces 6 make possible a meandering course of the coolant channels 8 circumferentially along the stator 2. The axially arranged housing caps 28 serve as axial boundaries of the coolant channels 8. The thick arrows indicate a coolant inlet into the coolant channel 8 (right arrow) and a coolant outlet out of the coolant channel 8 (left arrow).

Figure 4:
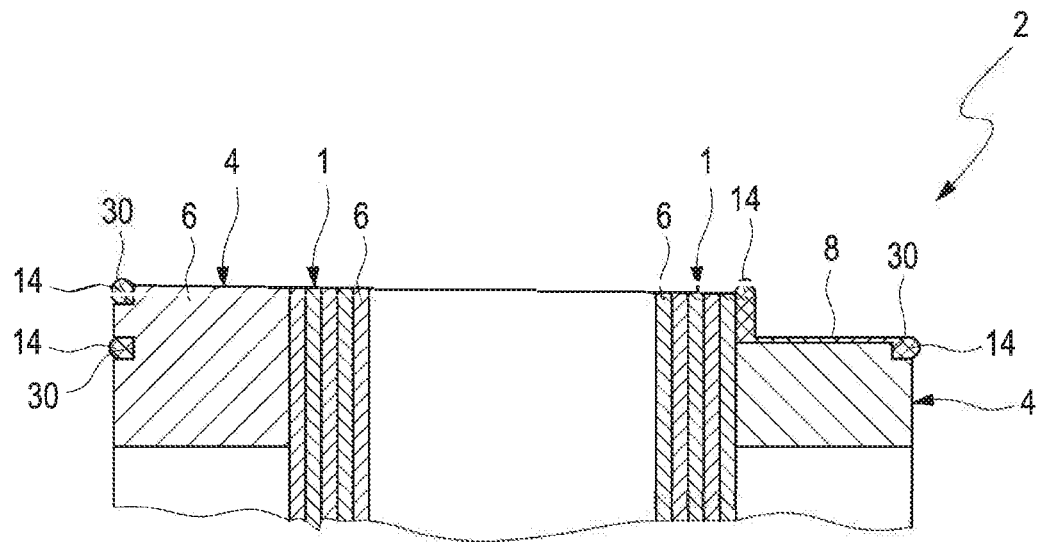
FIG. 4 a sectional illustration of a stator according to the invention along the sectioning line A-A from FIG. 3 in accordance with one embodiment.

FIG. 4 represents a sectional illustration of a stator 2 according to the invention along the sectioning line A-A from FIG. 3 in accordance with one embodiment. FIG. 4 demonstrates, in particular, the arrangement of the sealing means 14 in the region of the spacer rings 4. The spacer rings 4 have depressions 30 introduced on the front side for accommodating the sealing means 14. The housing caps 28 can be joined to the axially arranged sealing means 14 and can close the coolant channel 8 axially in a fluidtight manner.

Figure 5:
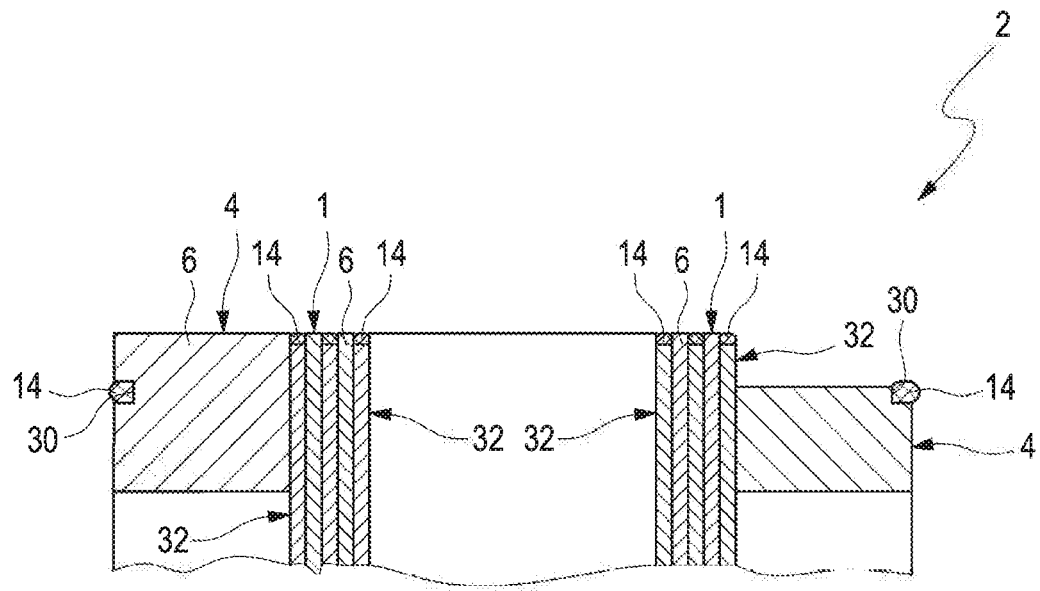
FIG. 5 a sectional illustration of a stator according to the invention along the sectioning line A-A from FIG. 3 in accordance with another embodiment.

FIG. 5 shows a sectional illustration of a stator 2 according to the invention along the sectioning line A-A from FIG. 3 in accordance with another embodiment. In this case, the stator 2 has sealing laminations 32, in addition to the laminations 1. The sealing laminations 32 have a smaller radius than the laminations 1 and, when the groove 12 from FIG. 1*b* is filled, can likewise be filled radially with the sealing means 14. In particular, by way of an arrangement of a sealing lamination 32 between two laminations 1, a groove for accommodating the sealing means 14 is formed thereby.

The invention claim is:

1. An electric motor, comprising:
an internal rotor motor, with a stator constructed from a plurality of laminations that are arrayed axially with respect to one another,
wherein the stator has stator teeth that are arranged in a direction of a rotor, which is arranged concentrically in the stator, for accommodating stator windings, a housing that encloses the stator radially, and two housing caps for axially closing the housing at both ends and for accommodating and carrying a shaft of the rotor,
wherein the laminations each have at least three crosspieces arranged on an outer diameter for creating at least one coolant channel between the stator and the housing,
wherein the at least one coolant channel is at least partially delimited by the housing caps in a fluidtight manner, such that the housing caps serve, at least partially, as a wall of the at least one coolant channel with the laminations and the housing,
wherein the stator has two spacer rings, between which the plurality of laminations are arranged, and each of the two spacer rings has at least one radially extending crosspiece which corresponds to at least one of the at least three crosspieces of the laminations, arranged on an outer diameter, and
wherein each of the two spacer rings are sealingly pressed between and against a corresponding one of the two housing caps and the plurality of laminations.

2. The electric motor according to claim 1, wherein the two spacer rings are arranged axially skewed with respect to each other.

3. The electric motor according to claim 1, wherein at least one crosspiece of at least one of the plurality of laminations has at least one groove for accommodating a sealing means which extends in a longitudinal direction with respect to the rotor.

4. The electric motor according to claim 3, wherein the at least one crosspiece of at least one of the spacer rings has a groove which corresponds to the at least one groove for accommodating a sealing means of the at least one of the plurality of laminations, which likewise accommodates the sealing means, and which likewise extends in the longitudinal direction with respect to the rotor.

5. The electric motor according to claim 1, wherein at least one spacer ring has at least one axially arranged groove for accommodating an axial sealing means between the at least one spacer ring and the corresponding one of the two housing caps.

6. The electric motor according to claim 3, wherein at least one coolant channel is coated at least in some regions with the sealing means.

7. The electric motor according to claim 1, wherein at feast one of the spacer rings is formed from an elastic material.

8. The electric motor according to claim 1, wherein, at least between a first lamination and a second lamination and between a last lamination and a penultimate lamination, respectively, the stator has at least one sealing lamination for accommodation of a sealing means on the outer diameter.

9. The electric motor according to claim 1, wherein the housing and/or at least one housing cap have or has at least one coolant inlet and at least one coolant outlet.

10. The electric motor according to claim 2, wherein at least one crosspiece of at least one of the plurality of laminations has at least one groove for accommodating a sealing means which extends in a longitudinal direction with respect to the rotor.

11. The electric motor according to claim 2, wherein at least one spacer ring has at least one axially arranged groove for accommodating an axial sealing means between the at least one spacer ring and the corresponding one of the two housing caps.

12. The electric motor according to claim 3, wherein at least one spacer ring has at least one axially arranged groove for accommodating an axial sealing means between the at least one spacer ring and the corresponding one of the two housing caps.

13. The electric motor according to claim 4, wherein at least one spacer ring has at least one axially arranged groove for accommodating an axial sealing means between the at least one spacer ring and the corresponding one of the two housing caps.

14. The electric motor according to claim 4, wherein at least one coolant channel is coated at least in some regions with the sealing means.

15. The electric motor according to claim 5, wherein at least one coolant channel is coated at least in some regions with the sealing means.

16. The electric motor of claim 1, wherein each of the two spacer rings protrude beyond corresponding winding heads of the stator.

17. The electric motor of claim 1, wherein the two housing caps extend around and seal against an outer diameter of the housing.

18. The electric motor of claim 2, wherein skewing of the two spacer rings results in the at least one coolant channel having a meandering course in which each pass traverses a longitudinal length, with respect to the rotor, of the plurality of laminations.

* * * * *